United States Patent [19]

Tootle

[11] Patent Number: 4,463,661
[45] Date of Patent: Aug. 7, 1984

[54] FLUID ACTUATOR WITH REMOTE LOCK RELEASE ASSEMBLY

[75] Inventor: James N. Tootle, Kalamazoo, Mich.
[73] Assignee: Pneumo Corporation, Boston, Mass.
[21] Appl. No.: 352,045
[22] Filed: Feb. 24, 1982
[51] Int. Cl.³ .............................................. F15B 15/26
[52] U.S. Cl. .................................... 92/17; 92/21 MR; 92/25; 92/27
[58] Field of Search .................. 92/15, 17, 28, 31, 24, 92/25, 27, 21 R, 21 MR, 23

[56] References Cited

U.S. PATENT DOCUMENTS

| | | | |
|---|---|---|---|
| 2,535,588 | 12/1950 | Mead | 92/21 MR |
| 2,688,232 | 9/1954 | Geyer | 60/97 |
| 2,774,336 | 12/1956 | Geyer | 92/17 |
| 2,815,005 | 12/1957 | Geyer | 121/40 |
| 3,180,234 | 4/1965 | Crawley et al. | 92/21 MR |
| 3,398,651 | 8/1968 | Folmer | 92/27 |
| 3,597,016 | 8/1971 | Gachot et al. | 92/27 |
| 3,699,850 | 10/1972 | Wagner | 92/24 |

Primary Examiner—Robert E. Garrett
Assistant Examiner—Richard L. Klein
Attorney, Agent, or Firm—Maky, Renner, Otto & Boisselle

[57] ABSTRACT

Actuator includes a lock mechanism for locking the actuator against movement in one end position, and a separate lock release assembly exteriorly mounted on the side of the actuator housing. The lock release assembly includes a toggle linkage directly engageable with the movable lock part to disengage the lock when a suitable force is applied to the toggle linkage exteriorly of the actuator. A lock spring is located immediately between the movable lock part and actuator piston for resetting the lock as the actuator nears such one end position.

20 Claims, 5 Drawing Figures

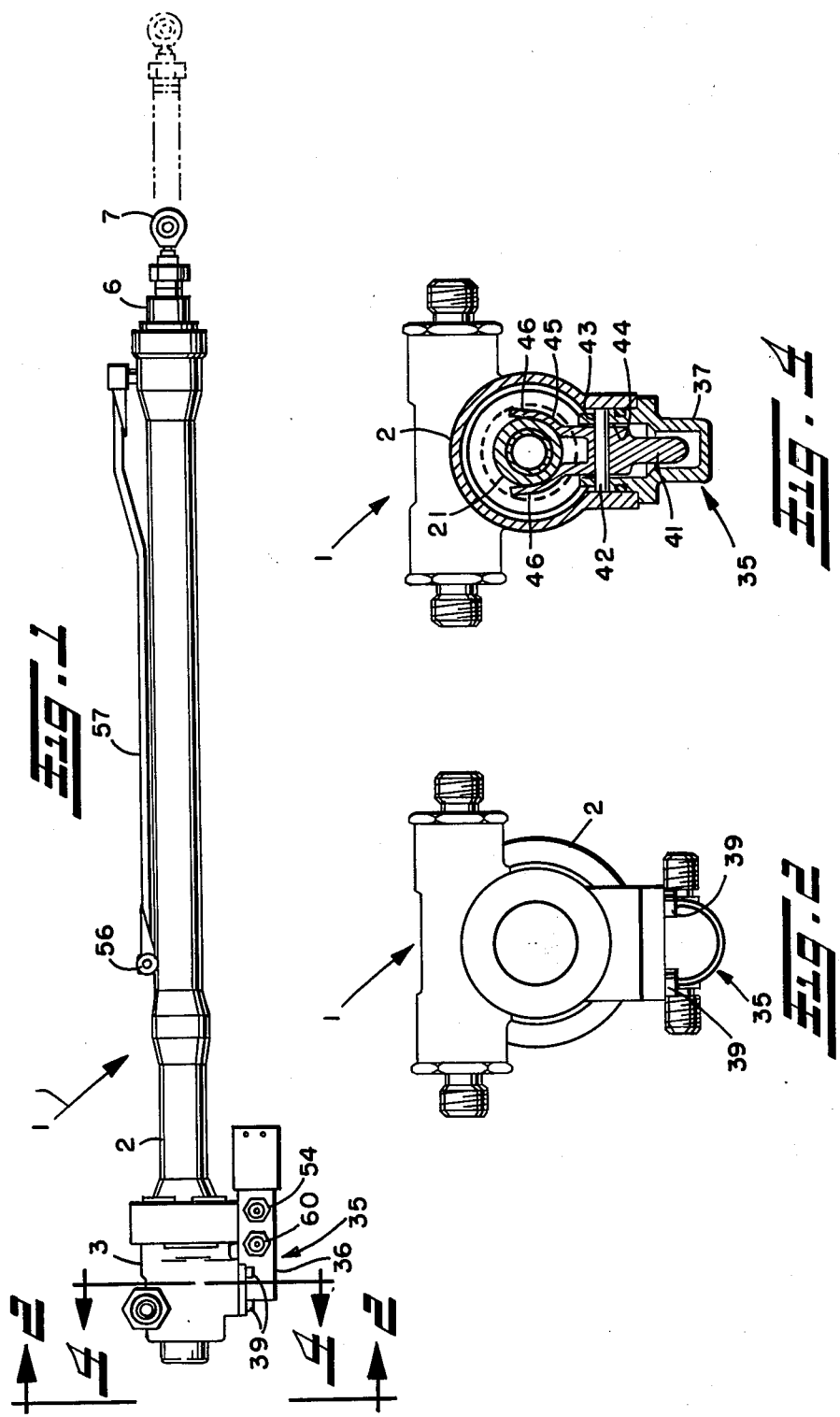

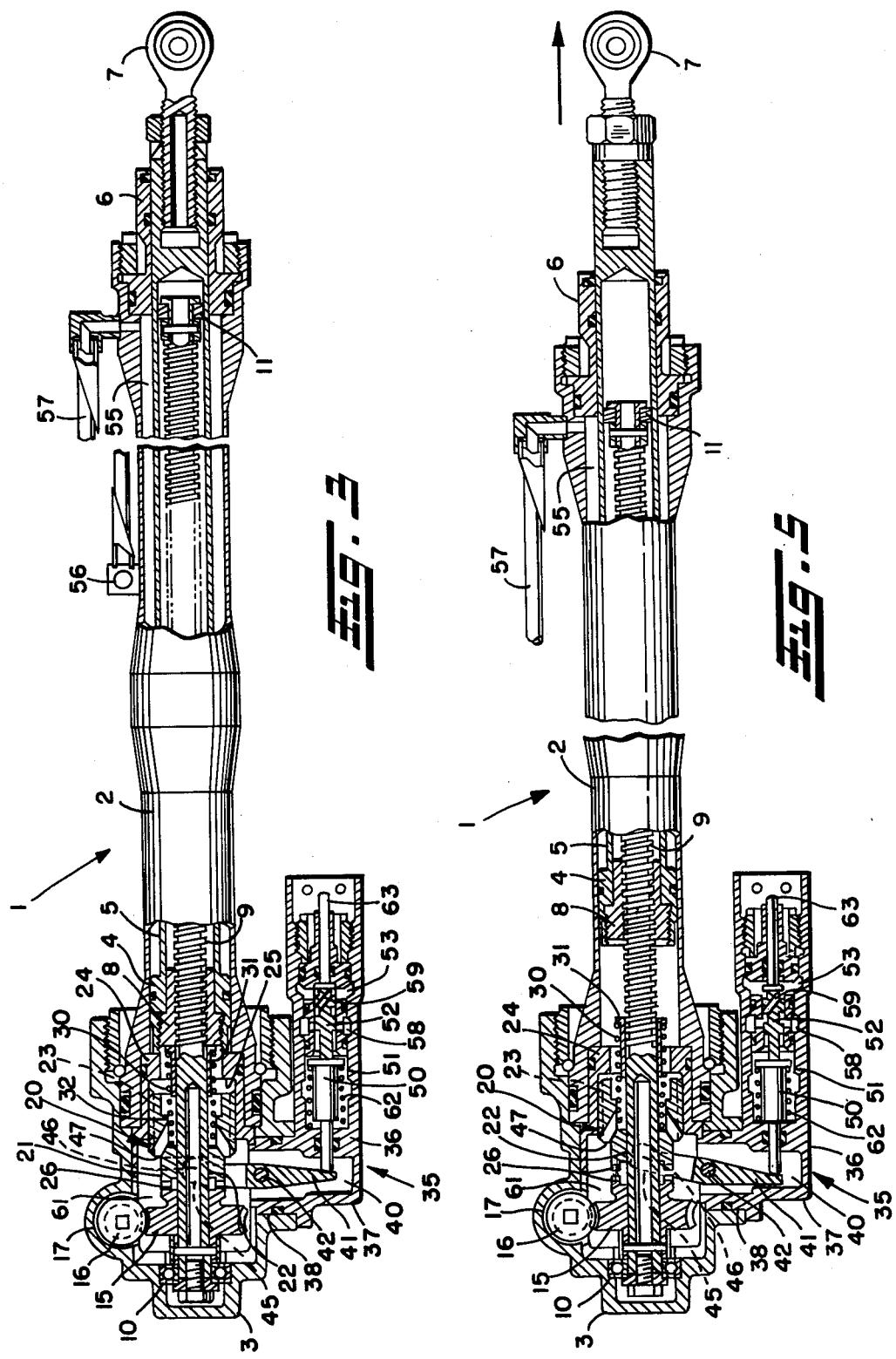

FLUID ACTUATOR WITH REMOTE LOCK RELEASE ASSEMBLY

BACKGROUND OF THE INVENTION

This invention relates generally as indicated to a fluid actuator with remote lock release assembly, and more particularly, to such an actuator in which the lock release assembly is exteriorly mounted on the side of the actuator housing.

In certain actuator installations, for example where the actuator is used to actuate the thrust reversers for a jet engine, a lock mechanism is utilized to lock the actuator against movement in one end position. Before the actuator can be moved away from such end position, the lock mechanism must be released. Heretofore, it has been the usual practice to provide a lock release mechanism on the end of the actuator housing, which may not always be possible due to over-all package considerations such as space requirements and the like. Also, the manner in which the lock release mechanism is connected to the actuator may make it difficult to service or replace.

SUMMARY OF THE INVENTION

With the foregoing in mind, it is a principal object of this invention to provide an actuator of the type generally indicated but in which the lock release assembly is mounted exteriorly on one side of the actuator housing.

Another object is to provide such an actuator in which the lock release assembly may readily be removed from the actuator housing for servicing or replacement.

A further object is to provide such an actuator in which a toggle linkage is used to transmit the lock release force directly to the movable lock part.

Still another object is to provide such an actuator in which a lock spring is placed directly between the movable lock part and actuator piston so that the piston compresses the spring as the actuator nears one end position to reset the lock.

These and other objects of the present invention may be achieved by providing a separate lock release assembly for attachment to one side of the actuator housing. The lock release assembly has an extension on one end adapted to be received in a valve port in the side of the actuator housing. The lock release force is transmitted to the movable lock part by a toggle linkage extending from the lock release assembly into the actuator housing and into direct engagement with the movable lock part. A spring interposed directly between the movable lock part and actuator piston is compressed as the actuator nears such one end position to reset the lock.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In said annexed drawings:

FIG. 1 is a side elevation view of a fluid actuator having a lock release assembly in accordance with this invention exteriorly mounted on one side of the actuator housing;

FIG. 2 is an enlarged end elevation view of the actuator and lock release assembly of FIG. 1 as seen from the plane of the line 2—2 thereof;

FIG. 3 is an enlarged fragmentary longitudinal section through the actuator and lock release assembly of FIG. 1, showing the actuator in the fully stowed and locked position;

FIG. 4 is an enlarged transverse section through the actuator housing and lock release assembly of FIG. 1, taken on the plane of the line 4—4 thereof; and FIG. 5 is an enlarged fragmentary longitudinal section through the actuator and lock release assembly similar to FIG. 3, but showing the lock disengaged by the lock release assembly and the actuator partially extended.

DETAILED DESCRIPTION OF THE PREFERRED EMBODIMENT

In the drawings there is shown a fluid actuator 1 such as may be used to actuate the thrust reversers for a jet engine. Such actuator includes a cylinder 2 having an actuator housing 3 at one end thereof. Axially movable within the cylinder 2 is a piston 4 which, as best seen in FIGS. 3 and 5, has a hollow rod 5 extending therefrom through the rod end 6 of the cylinder. A rod end assembly 7 may be provided on the outboard end of the rod to facilitate connection to the movable or stationary part of the device to be actuated. A suitable mount may also be provided on the actuator housing 3 or on the cylinder adjacent the head end thereof for connection to the other part of the device to be actuated.

Attached to the center of the piston 4 is a high lead Acme nut 8 coupled to a mating Acme screw shaft 9 within the hollow piston rod. One end of the screw shaft 9 may be journaled in suitable bearings 10 within the actuator housing 3, whereas the other end of the screw shaft extends into the hollow piston rod 5 a substantial distance beyond the nut and has a screw guide 11 attached to such outer end for supporting same within the hollow rod. As the piston 4 moves back and forth in the cylinder, the screw shaft 9 rotates at a speed proportional to the velocity of the piston.

Mounted on the screw shaft within the actuator housing is a high lead worm wheel 15 which mates with a worm shaft 16 mounted for rotation within a transverse bore 17 in the actuator housing. The ends of the worm shaft may be provided with double square holes or the like to facilitate attachment of a synchronous drive shaft or rod thereto. Since the speed of the worm shaft is also proportional to the velocity of the piston rod, when the worm shafts of two or more such actuators are connected together, they will be mechanically synchronized in both position and motion, as well known in the art.

When the actuator 1 is in the retracted or stowed position shown in FIG. 3, the actuator may be locked in such position by a lock mechanism 20 as described hereafter. The lock mechanism shown consists of a movable lock sleeve 21 axially movable within the actuator housing toward and away from the worm gear 15. The movable lock sleeve has a central opening 22 through which the screw shaft extends, with sufficient clearance therebetween to permit rotation of the screw shaft relative to the lock sleeve.

The lock sleeve 21 is retained against rotation within the actuator housing while permitting limited axial movement therewithin as by providing a splined connection 23 between the movable lock sleeve and a piston stop 24 within the housing. An internal shoulder 25 on the piston stop limits the extent of axial inward movement of the movable lock sleeve relative to the stop.

The adjacent end faces of the worm gear 15 and movable lock sleeve 21 have cooperating lock teeth 26 thereon which are shaped in such a manner that when engaged permit ratcheting of the worm gear relative to the movable lock sleeve during retraction of the piston 4 but not during extension thereof. Accordingly, the piston will continue to retract until it engages the retract stop 24. However, the piston cannot be extended as long as the cooperating lock teeth 26 are in engagement with each other, since the movable lock sleeve 21 locks the worm gear 15 and screw shaft 9 which drive same against rotation in a direction corresponding to that generated by extending the piston.

When the actuator piston is retracted as shown in FIG. 3, the movable lock sleeve is normally maintained in engagement with the worm gear by a spring 30 directly interposed between the movable lock sleeve and the piston head. The spring 30 may be supported by a retainer sleeve 31 surrounding the screw shaft. One end of the spring extends into a stepped bore 32 within the movable lock sleeve. During retraction of the actuator, as the piston 4 approaches the end of its stroke, the piston engages the spring retainer 31 and compresses the spring, causing the movable lock sleeve to engage the worm gear 15.

With the actuator in the stowed and locked position illustrated in FIG. 3, before the actuator can be extended, the lock sleeve 21 must be moved away from the worm gear 16 to disengage the lock teeth 26. Such movement may be effected by actuation of a lock release assembly 35 in accordance with the present invention, which is preferably mounted on the exterior of the actuator housing 3 remotely from the lock mechanism. The lock release assembly has its own housing 36 which may be attached to one side of the actuator housing with the axis thereof extending in a direction generally parallel to the axis of the actuator cylinder and in close association therewith as shown. At one end of the housing 36 is a generally right angle extension 37 which is adapted to be received in a valve port 38 in the actuator housing 3 and releasably attached thereto as by tap screws 39 or the like, such tap screws being shown in FIGS. 1 and 2. The extension 37 contains a transverse bore 40 in which a toggle linkage type lock release lever 41 is mounted on a shaft 42 for limited pivotal movement. The ends of the shaft 42 are received in aligned openings 43 in the extension wall 44 as shown in FIG. 4.

The lock release lever 41 extends into the actuator housing and has a fork 45 on its inner end extending around the sides of the movable lock sleeve 21. When the lever 41 is pivoted about the shaft 42 in a generally clockwise direction as viewed in FIGS. 3 and 5, the sides 46 of the fork will engage a shoulder portion 47 on the movable lock sleeve 21 to push the same out of engagement with the teeth 26 on the worm gear 15.

For actuating the lock release lever 41, the lock release assembly 35 includes a lock plunger 50 contained within a longitudinal bore 51 in the lock release assembly housing 36. The lock plunger is movable into engagement with the outer end of the lock release lever by a valve plunger 52 also contained within such longitudinal bore. When fluid pressure is admitted to a lock-in annulus 53 within the bore 51 through an exterior port 54 in the housing 36, the valve plunger 52 is urged to the left as seen in FIG. 5, pushing the lock plunger 50 into engagement with the outer end of the lock release lever and thus causing the lock release lever to pivot about the shaft 42 and move the lock sleeve 21 axially inwardly against the force of the spring 30 to disengage the lock sleeve from the worm gear. The extent of travel of the movable lock sleeve 21 by the lock release assembly may be adjusted by using toggle linkages 41 having different length arms on opposite sides of the pivot shaft 42.

Before fluid pressure is admitted to the lock-in annulus 53 for effecting such release of the lock, system pressure is also desirably applied to the retract end 55 of the cylinder through the retract port 56 and porting tube 57 to remove any axial tension loads on the actuator which might otherwise interfere with release of the lock. Then, with system pressure still applied to the retract port, system pressure is applied to the lock-in annulus 53 to release the lock as previously described.

After the valve plunger 52 has moved far enough to release the lock, the fluid pressure acting on the valve plunger may also be ported to a lock-out annulus 58 in the lock release assembly housing 36 through passageways 59 in the valve plunger for use in sequentially unlocking other actuators in the system if desired. The fluid pressure in the annulus 58 is directed to an exterior port 60 in the housing 36, shown in FIG. 1. A selector valve, not shown, is then actuated to cause system pressure to be admitted to the extend side 61 of each actuator in the system, for example, through the synchronizing shafts between actuators which communicate with the worm shaft bore 17 in the actuator housing 3. Since the area of the piston 4 exposed to the extend pressure is greater than that exposed to the retract pressure, the actuator will extend. As it does so, the piston and nut 8 carried thereby will move away from the spring thus causing the free length of the spring to increase as shown in FIG. 5 until it is no longer effective in applying a spring locking force to the movable lock sleeve 21.

To retract the actuator, the pressure acting on the extend side of the piston is reduced, as by connecting the extend side of the actuator to return pressure, while still maintaining system pressure on the retract side. At the same time, the lock-in annulus 53 is connected to return pressure, whereby a valve return spring 62 within the lock release assembly housing 36 will move the lock plunger 50 and valve plunger 52 away from the lock release lever 41 thus removing the unlocking force from the movable lock part 21.

During retraction of the piston, as the piston head nears the end of its stroke, the piston contacts the spring sleeve 31 and compresses the spring 30 sufficiently to cause the movable lock sleeve 21 to move into engagement with the worm gear 15. This normally occurs within the last 3/10 inch or so of the retract stroke. However, the actuator will continue to move in the stow direction until the actuator piston engages the internal stop 24 because of the torque developed by the screw shaft 9 which causes the lock teeth on the movable lock sleeve 21 to ratchet over the lock teeth on the worm gear. When the actuator piston engages the retract stop 24, the screw shaft also stops, and since the lock teeth 26 are already in engagement with each other, any motion that tends to extend the actuator will cause the locking faces of the lock teeth to engage thus providing a positive lock against such motion.

For effecting manual release of the lock, a manual lock release pin 63 may be provided in the lock release assembly housing 36 outwardly of the valve plunger 52. The outer end of the lock release pin 63 is preferably recessed within the lock release assembly housing to protect against inadvertent manual release of the lock.

To disengage the lock manually, a suitable tool may be inserted into the housing 36 to push the manual lock release pin 63 inwardly into engagement with the valve plunger with sufficient force to overcome the combined force of the valve return spring 62 and lock spring 30 so that the lock release lever 41 will move the lock sleeve 21 away from the worm gear to disengage the lock teeth.

Once the lock is released, the actuator may be extended mechanically as by rotating the worm shaft 16 using a suitable mechanical drive mechanism connected thereto. Once the actuator has been extended a sufficient distance, for example, slightly more than 3/10 inch, the lock spring 30 will be sufficiently lengthened such that it will no longer be effective to move the lock sleeve into engagement with the worm gear, whereby the force acting on the manual lock release pin 63 may also be released.

From the foregoing, it will now be apparent that the lock release assembly of the present invention may be positioned remotely from the lock on one side of the actuator housing to satisfy space requirements and the like and provide for ease of access to the lock release assembly to facilitate removal thereof for repair or replacement as required. Also, a toggle linkage is used to transmit the lock release force directly to the movable lock part rather than through one or more other parts, and the lock spring used to reset the lock is interposed directly between the movable lock part and piston head.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A fluid actuator comprising a cylinder, a piston axially movable within said cylinder, a member rotatably journaled in said cylinder and operatively connected to said piston such that axial movement of said piston effects and is dependent on rotation of said member, releaseable lock means interiorly of said actuator engageable with said member for preventing rotation of said member thereby locking said piston against movement, and lock release means mounted on one side of said actuator intermediate the ends thereof, said actuator having a port in said one side communicating with the interior of said actuator intermediate the ends thereof, and said lock release means having a lever extending through said port to the interior of said actuator for connection to said lock means, said lever being movable in a direction to release said lock means, said lock means including a first part axially movable into and out of locking engagement with a second part, said lever being movable into engagement with said first part to cause axial movement of said first part out of locking engagement with said second part, and a lock spring interposed directly between said first part and said piston, said lock spring being engageable by said piston as said piston approaches one stroke end position to compress said lock spring and force said first part into locking engagement with said second part to lock said piston against movement until released by actuation of said lock release means.

2. The actuator of claim 1 wherein said lock release means is contained in a separate housing extending in a direction generally parallel to the longitudinal axis of said actuator, said housing terminating axially inwardly of both ends of said actuator and having a right angle extension at one end adapted to be received in said port in said actuator, said lever being pivotally mounted within said extension.

3. The actuator of claim 2 wherein said housing has a longitudinal bore extending in a direction generally parallel to the longitudinal axis of said actuator, said bore containing a fluid pressure operated valve plunger for effecting such pivotal movement of said lever.

4. The actuator of claim 3 further comprising a lock plunger in said housing in coaxial alignment with said valve plunger, said lock plunger being movable by said valve plunger to effect such pivotal movement of said lever.

5. A fluid actuator comprising a cylinder, a piston axially movable within said cylinder, a member rotatably journaled in said cylinder and operatively connected to said piston such that axial movement of said piston effects and is dependent on rotation of said member, releasable lock means engageable with said member for preventing rotation of said member thereby locking said piston against movement, and lock release means mounted on one side of said actuator, said actuator having a port in said one side, and said lock release means having a lever extending through said port to the interior of said actuator for connection to said lock means, said lever being movable in a direction to release said lock means, said lock means including a first part axially movable into and out of locking engagement with a second part, said lever comprising a toggle linkage mounted for pivotal movement relative to said first part and engageable with said first part during such pivotal movement to cause axial movement of said first part out of locking engagement with said second part, said toggle linkage having a fork on the inner end thereof extending around the sides of said first part, said first part having a shoulder engageable by said fork during pivotal movement of said toggle linkage to effect such axial movement of said first part.

6. The actuator of claim 5 wherein said releasable lock means is contained within the interior of said actuator, and said lock release means is mounted intermediate the ends of said actuator on one side thereof.

7. The actuator of claim 5 further comprising a lock spring interposed directly between said first part and said piston, said lock spring being engageable by said piston as said piston approaches one stroke end position to compress said lock spring and force said first part into locking engagement with said second part to lock said piston against movement until released by actuation of said lock release means.

8. The actuator of claim 5 wherein said lock release means is contained in a separate housing extending in a direction generally parallel to the longitudinal axis of said actuator, said housing terminating axially inwardly of both ends of said actuator and having a right angle extension at one end adapted to be received in said port in said actuator, said lever being pivotally mounted within said extension.

9. The actuator of claim 8 wherein said housing has a lontudinal bore extending in a direction generally parallel to the longitudinal axis of said actuator, said bore containing a fluid pressure operated valve plunger for effecting such pivotal movement of said lever.

10. The actuator of claim 9 further comprising a lock plunger in said housing in coaxial alignment with said valve plunger, said lock plunger being movable by said valve plunger to effect such pivotal movement of said lever.

11. A fluid actuator comprising a cylinder, a piston axially movable within said cylinder, a member rotatably journaled in said cylinder and operatively connected to said piston such that axial movement of said piston effects and is dependent on rotation of said member, releasable lock means engageable with said member for preventing rotation of said member thereby locking said piston against movement, and lock release means mounted on one side of said actuator, said actuator having a port in said one side, and said lock release means having a lever extending through said port to the interior of said actuator for connection to said lock means, said lever being movable in a direction to release said lock means, said lock means including a first part axially movable into and out of locking engagement with a second part, said lever comprising a toggle linkage mounted for pivotal movement relative to said first part and engageable with said first part during such pivotal movement to cause axial movement of said first part out of locking engagement with said second part, and a lock spring interposed directly between said first part and said piston, said lock spring being engageable by said piston as said piston approaches one stroke end position to compress said lock spring and force said first part into locking engagement with said second part to lock said piston against movement until released by actuation of said lock release means.

12. A fluid actuator comprising a cylinder, a piston axially movable within said cylinder, a member rotatably journaled in said cylinder and operatively connected to said piston such that axial movement of said piston effects and is dependent on rotation of said member, releasable lock means engageable with said member for preventing rotation of said member thereby locking said piston against movement, and lock release means for releasing said lock means, said lock release means being externally mounted on one side of said actuator and having lever means extending into said actuator for transmitting a lock release force from said lock release means to said lock means, said cylinder having an actuator housing at one end containing said lock means, and said actuator housing has a port in one side through which said lever means extends, said lock release means being contained in a lock release housing having an extension on one end which is received in said port in said actuator housing, said lever means being mounted within said extension and extending through said port into said actuator housing, said lock means including a first part axially movable into and out of locking engagement with a second part, said lever means being mounted for pivotal movement within said extension and being engageable with said first part to cause axial movement of said first part out of locking engagement with said second part during pivotal movement of said lever means, said lever means having a fork on its inner end extending around the sides of said first part, and said first part has a shoulder engageable by said fork during such pivotal movement of said lever means to cause such axial movement of said first part.

13. A fluid actuator comprising a cylinder, a piston axially movable within said cylinder, a member rotatably journaled in said cylinder and operatively connected to said piston such that axial movement of said piston effects and is dependent on rotation of said member, releasable lock means engageable with said member for preventing rotation of said member thereby locking said piston against movement, and lock release means for releasing said lock means, said lock means including a first part axially movable into and out of locking engagement with a second part, said lock release means comprising a toggle linkage mounted for pivotal movement relative to said first part and engageable with said first part during such pivotal movement to cause axial movement of said first part out of locking engagement with said second part, said toggle linkage having a fork on the inner end thereof extending around the sides of said first part, said first part having a shoulder engageable by said fork during pivotal movement of said toggle linkage to effect such axial movement of said first part.

14. The actuator of claim 13 wherein said cylinder has an actuator housing at one end containing said lock means, and said actuator housing has a port in one side through which said toggle linkage extends.

15. The actuator of claim 14 wherein said lock release means is contained in a lock release housing having an extension on one end which is received in said port in said actuator housing, said toggle linkage being mounted within said extension and extending through said port into said actuator housing.

16. The actuator of claim 15 wherein said toggle linkage is mounted for pivotal movement within said extension.

17. The actuator of claim 13 wherein said releasable lock means is contained within the interior of said actuator, and said lock release means is contained in a separate housing mounted on one side of said actuator extending in a direction generally parallel to the longitudinal axis of said actuator, said actuator having a port in said one side, and said housing terminating short of either end of said actuator and having a right angle extension at one end adapted to be received in said port in said actuator, said toggle linkage being pivotally mounted within said extension.

18. The actuator of claim 17 wherein said housing has a longitudinal bore extending in a direction generally parallel to the longitudinal axis of said actuator, said bore containing a fluid pressure operated valve plunger for effecting such pivotal movement of said toggle linkage.

19. The actuator of claim 18 further comprising a lock plunger in said housing in coaxial alignment with said valve plunger, said lock plunger being movable by said valve plunger to effect such pivotal movement of said toggle linkage.

20. A fluid actuator comprising a cylinder, a piston axially movable within said cylinder, a member rotatably journaled in said cylinder and operatively connected to said piston such that axial movement of said piston effects and is dependent on rotation of said member, releasable lock means engageable with said member for preventing rotation of said member thereby locking said piston against movement, and lock release means for releasing said lock means, said lock means including a first part axially movable into and out of locking engagement with a second part, said lock release means comprising a toggle linkage mounted for pivotal movement relative to said first part and engageable with said first part during such pivotal movement to cause axial movement of said first part out of locking engagement with said second part, and a lock spring interposed directly between said first part and said piston, said lock spring being engageable by said piston as said piston approaches one stroke end position to compress said lock spring and force said first part into locking engagement with said second part to lock said piston against movement until released by actuation of said lock release means.

* * * * *